Sept. 21, 1926.
A. JACOBSON
FRUIT CRUSHING MACHINE
Filed Nov. 10, 1925
1,600,882
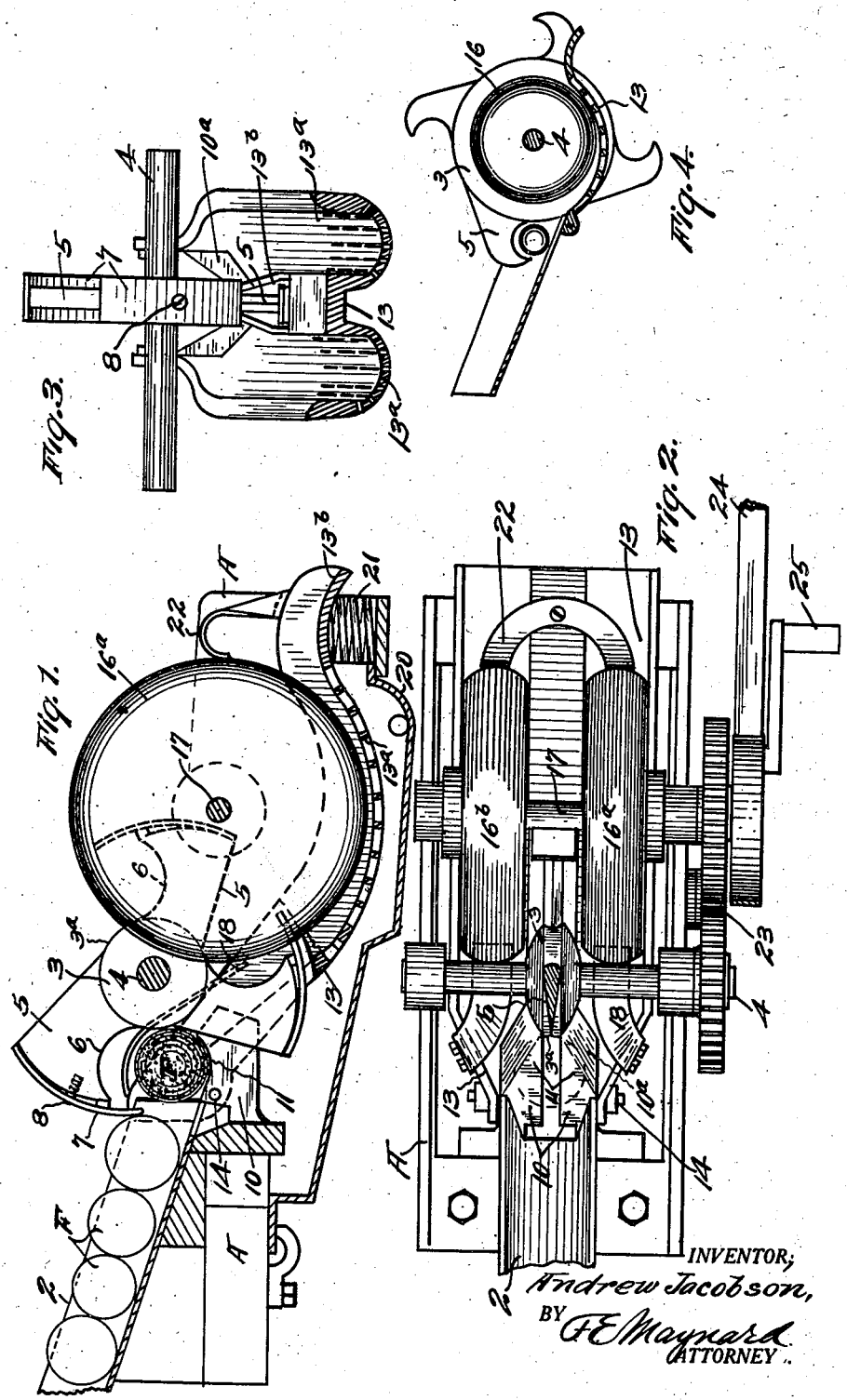
INVENTOR,
Andrew Jacobson,
BY
ATTORNEY.

Patented Sept. 21, 1926.

1,600,882

UNITED STATES PATENT OFFICE.

ANDREW JACOBSON, OF LOS ANGELES, CALIFORNIA.

FRUIT-CRUSHING MACHINE.

Application filed November 10, 1925. Serial No. 68,140.

This invention relates to apparatus for crushing fruit and vegetable bodies for the purpose of extracting their meat juices.

An object is to provide a simple, rugged and easily operable machine whereby the fruit body may be first automatically severed in halves and each half then subjected to a crushing action and the waste product ejected from the machine by the crushing means.

An object is to provide an automatic compensating means for handling oranges, for instance, of reasonable variation in a graded run without adjustment of the machine.

Other objects and advantages will be made manifest in the following specification of apparatus embodying the invention; it being understood that variations, modifications and adaptations may be resorted to within the scope and spirit of the invention.

Figure 1 is an elevation and sectional view.

Figure 2 is a plan and sectional view.

Figure 3 is a vertical cross-section.

Figure 4 is a side elevation and section of a modified form of the device.

The invention comprises a cutting means to halve an orange (or other vegetable or fruit) and means for crushing out the juice, and includes a suitable feed chute 2 for a single row of fruit F. Disposed on and perpendicular to the axis of this chute is a rotary cutter having a partition forming hub 3 on a shaft 4. The cutter has a plurality of radial cutting knives 5 with deeply incurved cutting edges 6 to overhook the nearest fruit F coming down the chute 2 and resting momentarily against a blunt nose part 3$^a$ of the hub between the knives 5.

On the outer ends of the knives are curved strips 7 for the purpose of separating or warding back the second orange from the one at the cutter so that only one fruit will be caught and cut at a time. Each ward 7 is adjustable by a screw 8 to be effective on fruit of different grade runs.

At the lower end of the chute 2 is a fixed platen 10 having a T-shaped slot to clear the sweeping knives with the wide wards 7. The platen has a curved seat 11 cooperating with the nose parts 3$^a$ of the hub 3 to hold an orange steady until a cutter knife 5 passes down through it and the platen.

The knives are wedge-shaped in cross-section for the purpose of thrusting the halves of the orange laterally and downward into a strong screen or sieve 13 having its upper end pivoted at 14 on the sides of the platen 10, whose end is provided with opposite declevities 10$^a$ for throwing off the orange halves which pass down into channels 13$^a$ in the sides of the screen 13. These channels begin at the platen 10 and pitch down so the the halves slide in easily with their slice planes uppermost.

The bottoms of the channels are perforated or foraminous and concave both longitudinally and transversely and terminate with discharge ends 13$^b$. The screen 13 is preferably adjustably or yieldably mounted so that it may be moved toward or from a crushing device here shown as comprising firm mashing rims 16$^a$—16$^b$ which are mounted on a shaft 17 and are so disposed that they pass down into the parallel fruit screens or channels 13$^a$.

To prevent the fruit halves from turning over guide fingers 18 are mounted at the intake ends of the chambers or channels 13$^a$ and as the halves pass from the fingers they are immediately engaged by the crushing rims 16$^a$—16$^b$ and gradually pressed down into the channels and squeezed and then carried around to the discharge end and ejected. The wall structure of the screen is slotted at 13$^c$ to clear the knives and fits close up to the diverting hub 3 of the cutter.

The screen is hung above a suitable pan 20 which catches the juice and is forced up by and supported on a strong spring 21 which allows for depression of the screen when large size fruit in a graded run pass under the crushing roller rims.

Scraping fingers 22 clean the rims as they leave the channels in the screen.

Figure 4 shows crushing rims 16 as disposed immediately at the sides of the rotary cutter hub 3.

Any suitable means may be employed for driving the rotating parts and as here shown the shafts 4—17 are intergeared at 23, and hand or other power is applied by belt 24 and crank 25.

The pan 20 is removably mounted as to the frame A which supports the various parts.

The invention claimed is:

1. A fruit crusher including a segmental screen having channels, crushing rims running in the channels, hook-edge chopping means for halving the fruit body passing into the channels, and means for holding the whole fruit centrally to the chopping means.

2. A fruit crushing apparatus including a concave, segmental screen having parallel channels for fruit halves, crushing means running in the channels, means for halving the fruit body and comprising a rotary cutter having a circular series of hook knives passing between the channels and a fruit support through which the cutter knives pass.

3. A fruit crusher including a screen having channels, crushing means running in the channels, a rotary cutter having radial blades to halve the fruit bodies as they pass into the channels, and means for holding the whole fruit centrally in the cutter blade path.

4. A fruit crushing apparatus including a screen having separate channels for fruit halves, crushing means running in the channels, and means independent of the crushing means for halving the fruit bodies before they pass into the channels; said screen being yieldingly mounted so as to provide for operation on different sizes of bodies and a stationary table for holding fruit while it is divided.

5. A fruit crusher including a rotary cutter having a series of radial knives, a feed chute leading to the plane of the knives, means through which said knives sweep and for holding the fruit body so as to be diametrically cut by the sweeping knives, channels for receiving the halves of the body, and crushing means independent of the knives and running in the channels for drawing along and crushing the halves therein.

6. In a machine for halving and then crushing spherical fruit bodies, a stationary platen on which an individual fruit is supported, a cutter sweeping through the platen to halve the fruit thereon, means to feed fruit to the platen, a screen device having separated paths for the respective halves of the cut fruit, and roller means operative in the screen to crush the fruit.

7. In a machine for halving and then crushing spherical fruit bodies, a stationary platen on which an individual fruit is supported, a cutter sweeping through the platen to halve the fruit thereon, means for feeding fruit to the platen, a segmental, internally and longitudinally concaved trough having a perforated bottom, and crushing roller means extending into and longitudinally along the concave of the trough to crush fruit therein.

8. A machine of the character set forth in claim 7, and having means for guiding the halves in proper position from the cutter to the trough and crushing means.

ANDREW JACOBSON.